United States Patent
Almanza-Workman et al.

(10) Patent No.: US 11,630,325 B1
(45) Date of Patent: Apr. 18, 2023

(54) AUGMENTED REALITY DEVICES WITH PRESCRIPTION LENSES

(71) Applicant: Amazon Technologies, Inc., Seattle, WA (US)

(72) Inventors: Angeles Marcia Almanza-Workman, Sunnyvale, CA (US); Robert Waverly Zehner, Sunnyvale, CA (US); Suchit Shah, San Jose, CA (US); Kibyung Seong, Santa Clara, CA (US); Jon H. Appleby, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 17/146,034

(22) Filed: Jan. 11, 2021

Related U.S. Application Data

(60) Provisional application No. 63/055,457, filed on Jul. 23, 2020.

(51) Int. Cl.
| | | |
|---|---|---|
| *G02B 27/01* | (2006.01) | |
| *G02C 7/02* | (2006.01) | |
| *G02B 1/11* | (2015.01) | |
| *G02C 11/00* | (2006.01) | |

(52) U.S. Cl.
CPC ............. *G02C 7/02* (2013.01); *G02B 1/11* (2013.01); *G02B 27/0172* (2013.01); *G02C 11/10* (2013.01); *G02B 2027/0178* (2013.01); *G02C 2202/16* (2013.01)

(58) Field of Classification Search
CPC .... G02B 2027/0178; G02B 1/11; G02B 1/10; G02B 27/0172; G02B 27/017; G02C 2202/01; G02C 7/02; G02C 7/00; G02C 11/10; G02C 11/00
USPC ........................................................ 351/158
See application file for complete search history.

(56) References Cited

U.S. PATENT DOCUMENTS

| | | | | |
|---|---|---|---|---|
| 5,210,553 | A * | 5/1993 | Barth .................... | G02C 7/065 351/159.42 |
| 10,353,202 | B2 * | 7/2019 | Tervo ................... | G02B 6/0026 |
| 11,108,977 | B1 * | 8/2021 | Sharma ................. | H04N 5/332 |
| 2013/0314793 | A1 * | 11/2013 | Robbins ............. | G02B 27/0172 359/630 |
| 2017/0357089 | A1 * | 12/2017 | Tervo ................... | G02B 6/0026 |
| 2018/0356639 | A1 * | 12/2018 | Schaefer .............. | G02B 27/017 |
| 2020/0026074 | A1 * | 1/2020 | Waldern .............. | G02B 6/0076 |
| 2020/0192088 | A1 * | 6/2020 | Yu ....................... | G02B 27/0081 |
| 2020/0264367 | A1 * | 8/2020 | Huang ............... | G02B 27/0101 |
| 2020/0326543 | A1 * | 10/2020 | Kim ...................... | G06V 40/19 |
| 2020/0363581 | A1 * | 11/2020 | Li ........................ | G02B 6/0076 |

(Continued)

*Primary Examiner* — William R Alexander
(74) *Attorney, Agent, or Firm* — Eversheds Sutherland (US) LLP

(57) ABSTRACT

Systems and methods are disclosed for augmented reality devices with prescription lenses. An example augmented reality device may include a frame and a lens coupled to the frame. The lens may include a prescription lens configured to refract light, the prescription lens having a first index of refraction value, a waveguide encapsulated in the prescription lens, the waveguide having a second index of refraction value, and a first coating layer disposed on a first side of the waveguide, the first coating layer having a third index of refraction value. The third index of refraction value may be less than the first index of refraction value, and the first index of refraction value may be less than the second index of refraction value.

20 Claims, 7 Drawing Sheets

(56) References Cited

U.S. PATENT DOCUMENTS

| | | | |
|---|---|---|---|
| 2021/0041703 A1* | 2/2021 | Komanduri | G02B 27/0172 |
| 2021/0181533 A1* | 6/2021 | Kim | G02C 7/088 |
| 2021/0191038 A1* | 6/2021 | Huang | G02B 6/124 |
| 2022/0099974 A1* | 3/2022 | Han | G02B 27/0172 |
| 2022/0236472 A1* | 7/2022 | Schultz | B29D 11/00721 |
| 2022/0244450 A1* | 8/2022 | Geng | G02B 27/0172 |

\* cited by examiner

AUGMENTED REALITY DEVICES WITH PRESCRIPTION LENSES

CROSS-REFERENCE TO RELATED APPLICATION

This application claims the benefit of U.S. Application No. 63/055,457, filed Jul. 23, 2020, which is hereby incorporated by reference in its entirety.

BACKGROUND

Some users may wear prescription eyewear, which may be difficult to incorporate into certain electronic devices, such as augmented reality glasses or other forms of electronic devices. For example, some people may use prescription lenses or other corrective vision devices for clear vision. Such lenses may be physically located in front of the user's eyes. This may cause issues with use of other devices, such as augmented reality glasses, virtual reality glasses, and other devices that also are physically located in front of the user's eyes. Wearing two pair of glasses or more than one device may be cumbersome or impractical. Combining corrective lenses with other electronic devices may be difficult due to a number of factors, including weight issues, balancing issues, size issues, and other issues. Accordingly, electronic devices with integrated prescription lenses may be desired.

Figure 1:
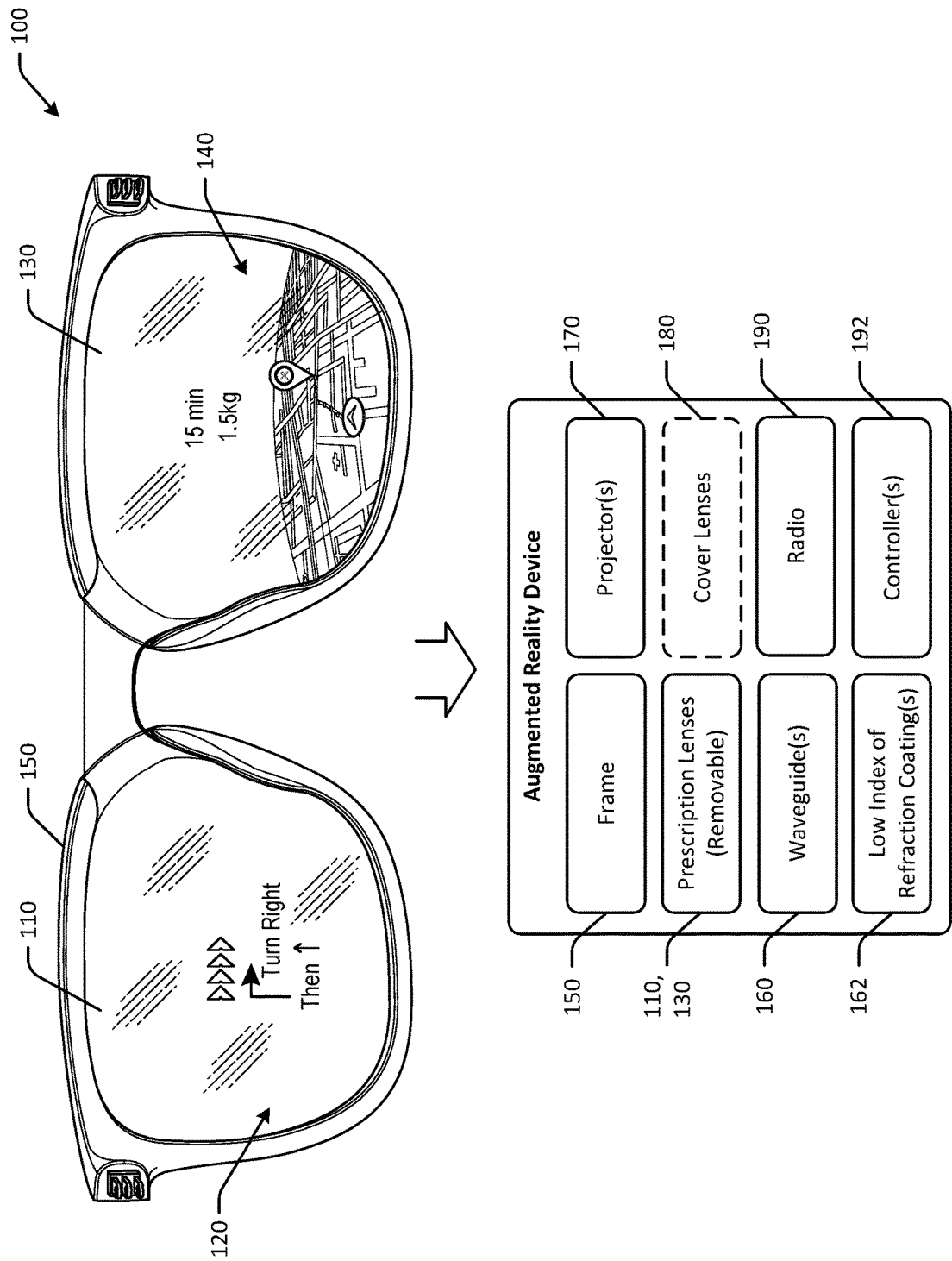
FIG. 1 is a schematic drawing of an example use case of augmented reality devices with prescription lenses in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Prescription eyewear, such as corrective lenses, may be used by people to improve eyesight. Such lenses may refract light in accordance with a user's prescription, which may in turn improve eyesight when using corrective lenses. However, the mechanical nature of corrective lenses may make it difficult or cumbersome for people that use corrective lenses to use other devices, such as augmented reality glasses, virtual reality glasses, and so forth. Although users may be physically able to wear more than one pair of glasses at a time, such solutions may be impractical and may provide a temporary solution.

Integration of prescription lenses with electronic displays, as may be the case with augmented reality glasses that include displays, may be difficult due to weight balancing issues, overall weight issues, comfort issues, size issues, and other issues. In addition, optics challenges that need to be addressed include field of view size for displays used in augmented reality glasses, projection of images while maintaining the correct amount of light refraction for prescription lenses, and so forth.

Near eye displays, such as displays that are to be positioned near a user's eye (e.g., glasses, etc.), may use waveguides to display electronic content. The electronic content displayed in the device via the waveguide may appear overlaid on real-world objects visible through a clear lens of the glasses, as depicted in the example of FIG. 1. The electronic content may include various content, such as navigation directions, promotional offers, metadata, and other content. Waveguides may be designed for use without prescription lenses, and users that wear prescription lenses may therefore have to wear two pair of glasses to experience augmented reality glasses.

In contrast, the augmented reality devices with prescription lenses described herein include waveguide-based displays that can be used to provide augmented reality functionality while at the same time providing prescription lenses. Users may therefore receive the benefit of prescription lenses and augmented reality content in a single pair of glasses without a bulky or heavy assembly, and without weight balancing issues that may cause discomfort or prevent all day usability (e.g., the devices described herein may not repeatedly slide down bridges of noses, etc.).

This disclosure relates to, among other things, systems, methods, computer-readable media, techniques, and methodologies for producing augmented reality devices with prescription lenses. Certain embodiments may include waveguides that are embedded in prescription lenses, so as to provide prescription lens light refraction, as well as augmented reality display capabilities. Some embodiments include waveguides and prescription lens assemblies with removable prescription lenses, such that the prescription lens can be removed and/or replaced in the event that a user's prescription changes or the lens is damaged. By providing a compact and integrated lens assembly, both prescription lens and augmented reality benefits can be provided in a compact and comfortable form factor.

Referring to FIG. 1, an example use case of augmented reality devices with prescription lenses in accordance with one or more embodiments of the disclosure. Some embodiments may be monocular, while others can be binocular. The augmented reality device may be augmented reality glasses 100 with prescription lenses. For example, the augmented reality glasses 100 may include a first prescription lens 110 and a second prescription lens 130 supported in a wearable frame 150. The first prescription lens 110 and the second prescription lens 130 may have the same or different diopter prescription. The first prescription lens 110 and the second prescription lens 130 may refract light to correct vision for a wearer of the augmented reality glasses 100. One or both the first prescription lens 110 and the second prescription lens 130 may be removable from the wearable frame 150, as discussed in more detail with respect to FIG. 4. The augmented reality glasses 100 may include optional zero-power cover lenses 180 that may form an outer lens of the augmented reality glasses 100. The augmented reality glasses 100 may include a wireless radio 190 and one or more controllers 192 that may be used to wirelessly communicate with other devices, such as smartphones, tablets, and other electronic devices.

One or both of the prescription lenses may include augmented reality functionality, and may therefore be configured to display electronic content. For example, the first prescription lens 110 may be configured to display first electronic content 120, and the second prescription lens 130 may be configured to display second electronic content 140. The electronic content may be any suitable electronic content, and may include augmented reality content such as navigation directions, contextual information, ambient environment information, and so forth.

To present electronic content, the augmented reality glasses 100 may include one or more waveguides 160 and one or more projectors 170. For example, the first prescription lens 110 may include a first waveguide, and the second prescription lens 130 may include a second waveguide. The projector(s) 170 may be used to project images onto the respective waveguides 160. The waveguides 160 may be optical waveguides that operate by total internal reflection. Total internal reflection occurs when light remains in a first medium upon incidence at a boundary with a second medium because the index of refraction of the first medium is greater than the index of refraction of the second medium, and the angle of incidence of the light at the boundary is above a specific critical angle that is a function of those refractive indices. Total internal reflection may also result in minimal or zero light leakage about the waveguide. Waveguides may also need to be optically clear, so as to not obstruct the real world view of a user wearing the augmented reality glasses 100. The augmented reality glasses 100 may therefore include an optical combiner that reflects a virtual image while transmitting external light to the human eye, overlaying the virtual content on top of the real scene, for the two to augment each other.

Typically, when combining prescription lenses and smart glasses with diffractive waveguides, an air gap is used between the lenses to preserve the required differential index of refraction and to attempt to achieve total internal reflection. In contrast, embodiments of this disclosure include an implementation having a low index of refraction coating between a high index of refraction waveguide and prescription lens polymeric material to eliminate the air gap. A index of refraction value of an optical medium, such as the coating layers of the waveguide, is a dimensionless number that indicates how light, or any other radiation, propagates through that specific medium. A index of refraction value of a specific medium is defined as $n=c/v$ where c is the speed of light in vacuum and v is the speed of light in the substance. For example, the index of refraction value of water is 1.33, meaning that light travels 1.33 times faster in a vacuum than it does in water. Other methods of calculating or measuring index of refraction values may be used herein.

The waveguide may include one or more coating layers 162 of a low index of refraction material. For example, the waveguide 160 may include a first low index of refraction coating layer on a first side of the waveguide 160, and a second low index of refraction coating layer on a second side of the waveguide 160. Standard low index of refraction coatings contain fluorinated polymer backbones that have poor adhesion properties impacting structural integrity and with minimum index of refraction of 1.3. A polysiloxane coating with either nano-porosity or hollow nano-fillers can provide index of refraction equal to or greater than 1.2 without introducing haze or scattering in the optical path. In one example, the index of refraction value of a waveguide formed of polycarbonate material may be 1.59 (e.g., $n=1.59$), whereas a or poly(methyl methacrylate) (PMMA) material may have a index of refraction value of about 1.49. Other embodiments may have different index of refraction values, such as index of refraction values of 1.8 to 2.0.

Additionally, polysiloxane surface properties can be tuned to improve adhesion to glass and other polymeric materials. This polysiloxane coating can be formulated to cure thermally or by UV light. An additional barrier layer may be used to avoid solvents or monomers of the prescription lens material to penetrate the hollow nano-fillers or nano-pores. In some embodiments, prescription lens resin could be printed/casted directly onto high index glass (e.g., a higher index of refraction glass).

Example embodiments of the disclosure provide a number of technical features or technical effects. For example, in accordance with example embodiments of the disclosure, certain embodiments of the disclosure may provide prescription lenses with integrated waveguides, so as to provide augmented reality or electronic content display functionality. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
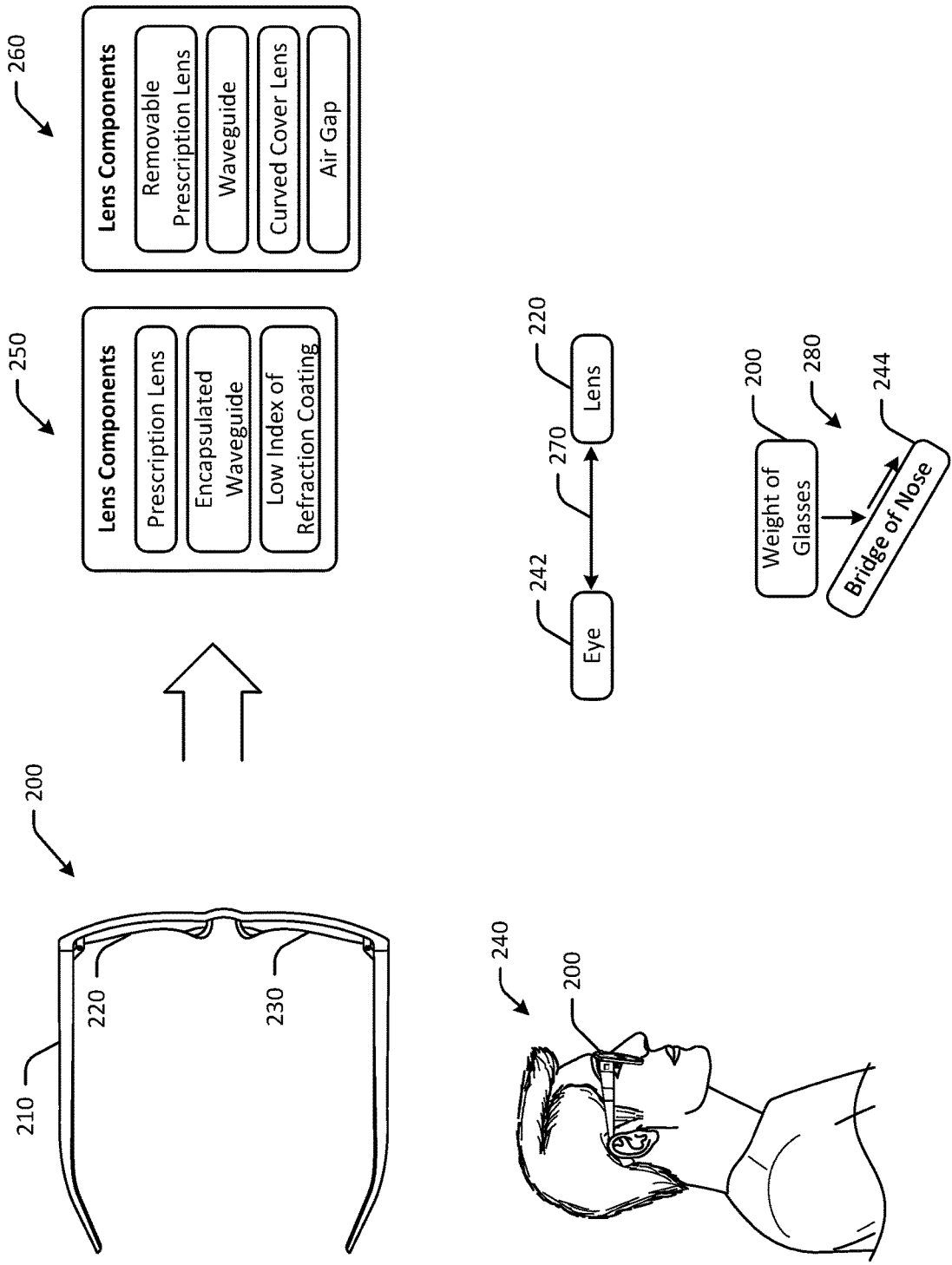
FIG. 2 is a schematic drawing of example lens components for various embodiments of augmented reality devices with prescription lenses, as well as a schematic illustration of glasses positioning on a human nose in accordance with one or more embodiments of the disclosure.

FIG. 2 is a schematic drawing of example lens components for various embodiments of augmented reality devices with prescription lenses, as well as a schematic illustration of glasses positioning on a human nose in accordance with one or more embodiments of the disclosure. Other embodiments may include additional or fewer components. The illustrations of FIG. 2 are for illustrative purposes only and are provided only as an example implementation.

In FIG. 2, augmented reality glasses 200 are depicted in a top view. The augmented reality glasses 200 may have a frame 210 that supports a first lens assembly 220 and a second lens assembly 230. The augmented reality glasses may include, in some embodiments, a projector coupled to the lens assemblies and configured to project an image using a waveguide of the respective lens assemblies. The projector may be disposed inside the frame 210. The augmented reality glasses 200 may include a wireless radio disposed inside the frame 210, and a battery disposed inside the frame 210.

The lens assemblies may include prescription lenses, as well as waveguides in an integrated display package. For example, in a first embodiment 250 of a lens assembly, the lens assembly components may include a prescription lens, a waveguide encapsulated in the prescription lens, and one or more low index of refraction coatings (e.g., coatings formed of a material having a low index of refraction, such as an index of refraction value of 1.25, etc.) disposed on the waveguide. The first embodiment 250 is discussed in more detail with respect to FIG. 3. The waveguide may be disposed between low index of refraction coatings on both sides. In one example embodiment, the waveguide glass may have an index of refraction between about 1.7 and about 1.8, the low index of refraction coating may have an index of refraction of about 1.25, and a prescription lens material may have an index of refraction of about 1.53.

In a second embodiment 260 of a lens assembly, the lens assembly components may include a removable prescription lens, a waveguide, a curved cover lens, and an air gap that separates the prescription lens from the waveguide. The second embodiment 260 may not include the low index of refraction coatings, and may utilize the air gap instead for total internal reflection purposes. The second embodiment 260 is discussed in more detail with respect to FIG. 4. The waveguide may be disposed between the curved cover lens and the prescription lens. In one example embodiment, the waveguide glass may have an index of refraction between about 1.7 and about 2.0, and a prescription lens material may have an index of refraction of about 1.53. In the second embodiment 260, unlike in the first embodiment 250, the prescription lens may be removable from the lens assembly, and can be independently replaced. As a result, if the prescription lens is damaged or a user's prescription changes, the prescription lens can be removed and replaced. However, the first embodiment 250 may provide improved structural rigidity and impact resistance than the second embodiment 260.

The augmented reality glasses 200 with the first lens assembly 220 and the second lens assembly 230 may provide a number of practical benefits for both the first embodiment 250 and the second embodiment 260 of the lens assembly. For example, both embodiments may provide lightweight (e.g., relative to double lens or double glasses frames solutions, etc.), small eye relief, and well balanced lenses that can be used to produce comfortable glasses that can be worn for lengths of time without becoming uncomfortable or requiring continuous adjustment. For example, as depicted in a side view 240 of a human wearing the augmented reality glasses 200, a distance 270 between an eye 242 of the human and the lens assembly 220 may affect a size of a field of view, as well as a likelihood that the augmented reality glasses 200 will slide down a bridge 244 of the user's nose. For example, the greater the distance 270, the smaller the field of view for the user, and the smaller the size of the content projected using the lens assembly 220. In addition, the greater the distance 270, the more likely the weight of the augmented reality glasses 200 will cause a sliding motion 280 down the bridge 244 of the user's nose. If this occurs, the user may have to continuously readjust positioning of the augmented reality glasses 200. As the augmented reality glasses 200 slide, the distance 270 increases as well, compounding the potential issue. By providing a balanced and lightweight solution, these issues are avoided.

Figure 3:
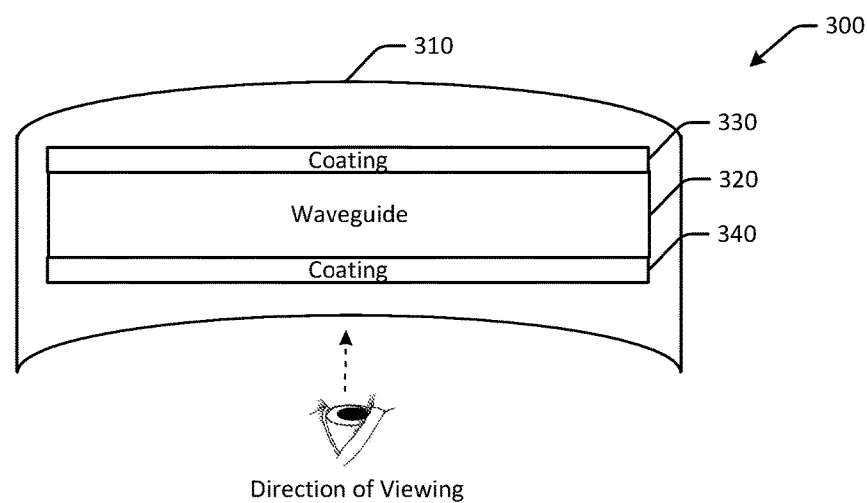
FIG. 3 is a schematic drawing of a cross-sectional view of a lens assembly in accordance with one or more embodiments of the disclosure.
Figure 3:
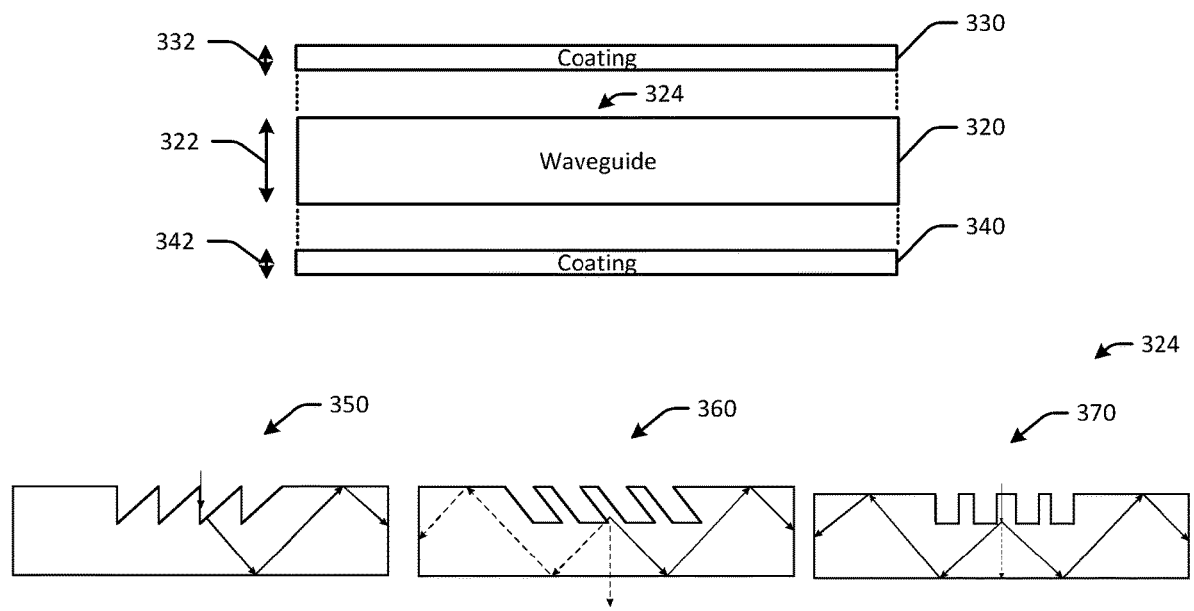

FIG. 3 is a schematic drawing of a cross-sectional view of a lens assembly 300 in accordance with one or more embodiments of the disclosure. Other embodiments may include additional or fewer components. The illustrations of FIG. 3 are for illustrative purposes only and are provided only as an example implementation.

The lens assembly 300 may be used with augmented reality devices, such as augmented reality glasses, to provide prescription lenses with integrated waveguides and associated augmented reality functionality. For example, the augmented reality device or glasses may include a wearable frame, and the lens assembly 300 coupled to the wearable frame.

The lens assembly 300 may include a prescription lens 310 and a waveguide 320. The prescription lens 310 may be configured to refract light according to a diopter prescription for a user. The prescription lens 310 may be formed of a material that has a first index of refraction value. For example, the prescription lens 310 may be formed of a plastic or glass material having an index of refraction value of 1.53. The waveguide 320 may be formed of a material that has a second index of refraction value. For example, the waveguide 320 may be formed of a plastic or glass material having an index of refraction value of between about 1.7 and 1.8. The waveguide 320 may be embedded in, encapsulated in, or otherwise integrated with the prescription lens 310. In some embodiments, the prescription lens material may be 3D printed, cast, laminated, or otherwise formed about the waveguide 320.

The waveguide 320 may include one or more layers of a low index of refraction coating. For example, the lens assembly 300 may include a first coating layer 330 disposed on a first side of the waveguide 320, where the first coating layer 330 is formed of a material having a third index of refraction value. The waveguide 320 may include an optional second coating layer 340 on a second side of the waveguide 320, where the second coating layer 340 has the third index of refraction value. The third index of refraction value may be less than the second index of refraction value. For example, the third index of refraction value may be 1.25. In some embodiments, a difference between the second index of refraction value and the third index of refraction value may be 0.50. Similarly, in some embodiments, a difference between the first index of refraction value and the second index of refraction value may be 0.5. In some embodiments, the third index of refraction value is less than the first index of refraction value, and the first index of refraction value is less than the second index of refraction value. For example, the first index of refraction value may be about 1.53, the second index of refraction value may be about 1.8 to about 2.0, and the third index of refraction value may be equal to or less than about 1.25.

The first coating layer 330 and/or the second coating layer 340 may be printed or cast onto the waveguide 320, so as to reduce overall thickness and decrease manufacturing complexity. In other embodiments, the first coating layer 330 and/or the second coating layer 340 may be 3D printed, laminated, ultraviolet or thermal casted, molded, or otherwise deposited onto the waveguide 320. The first coating layer 330 and/or the second coating layer 340 may be used instead of an air gap.

As depicted in the exploded cross-sectional view in FIG. 3, the waveguide 320 may include a set of surface features 324 formed on the first side, or the outer side, of the waveguide 320. The surface features 324 may include grooves, raised protrusions, bumps, volumetric holographic gratings, or other surface features, and may improve optics or other light transmission properties. For example, three types of example surface features 324 are illustrated in cross-sectional view in FIG. 3. A first type of surface feature 350 may be a slanted grading pattern with a number of triangular shaped grooves or grading formed in the surface. The first type of surface feature 350 may result in redirection of light as depicted in FIG. 3 via a number of arrows. A second type of surface feature 360 may be a slanted grading pattern with a number of rhombus shaped grooves or grading formed in the surface. The second type of surface feature 360 may result in redirection of light as depicted in FIG. 3 via a number of arrows. A third type of surface feature 370 may be a grading pattern with a number of vertically oriented rectangular shaped grooves or grading formed in the surface. The third type of surface feature 370 may result in redirection of light as depicted in FIG. 3 via a number of arrows.

The first coating layer 330 may have a first thickness 332 of about 2 microns to about 5 microns. The second coating layer 340 may have a second thickness 342 that may be the same or different than the first thickness 332. The second thickness 342 may be between about 2 microns to about 5 microns. The waveguide 320 may have a third thickness 322 of about 0.5 millimeter. The prescription lens 310 may have an overall thickness of about 1.0 millimeter. Accordingly, the prescription lens 310 may be thicker than the waveguide 320, and the waveguide 320 may be thicker than the first coating layer 330. For example, the prescription lens 320 may have a thickness of at least 1 millimeter, the waveguide 320 may have a thickness of about 0.5 millimeter, and the first coating layer 330 and the second coating layer 340 may each have a thickness of about 0.25 millimeter. Average thickness may be an average of the thickness of a component from one end to another end. For example, a prescription lens may have a center thickness that is greater than or lower than its average thickness.

The prescription lens 310 may have a non-planar contour, or a curved geometry, whereas the waveguide 320 may have a planar contour or a flat geometry. The planar contour may improve total internal reflection properties of the waveguide 320. In some embodiments, the prescription lens 310 may be a 3D printed prescription lens, and the waveguide 320 may be a 3D printed waveguide.

Figure 4:
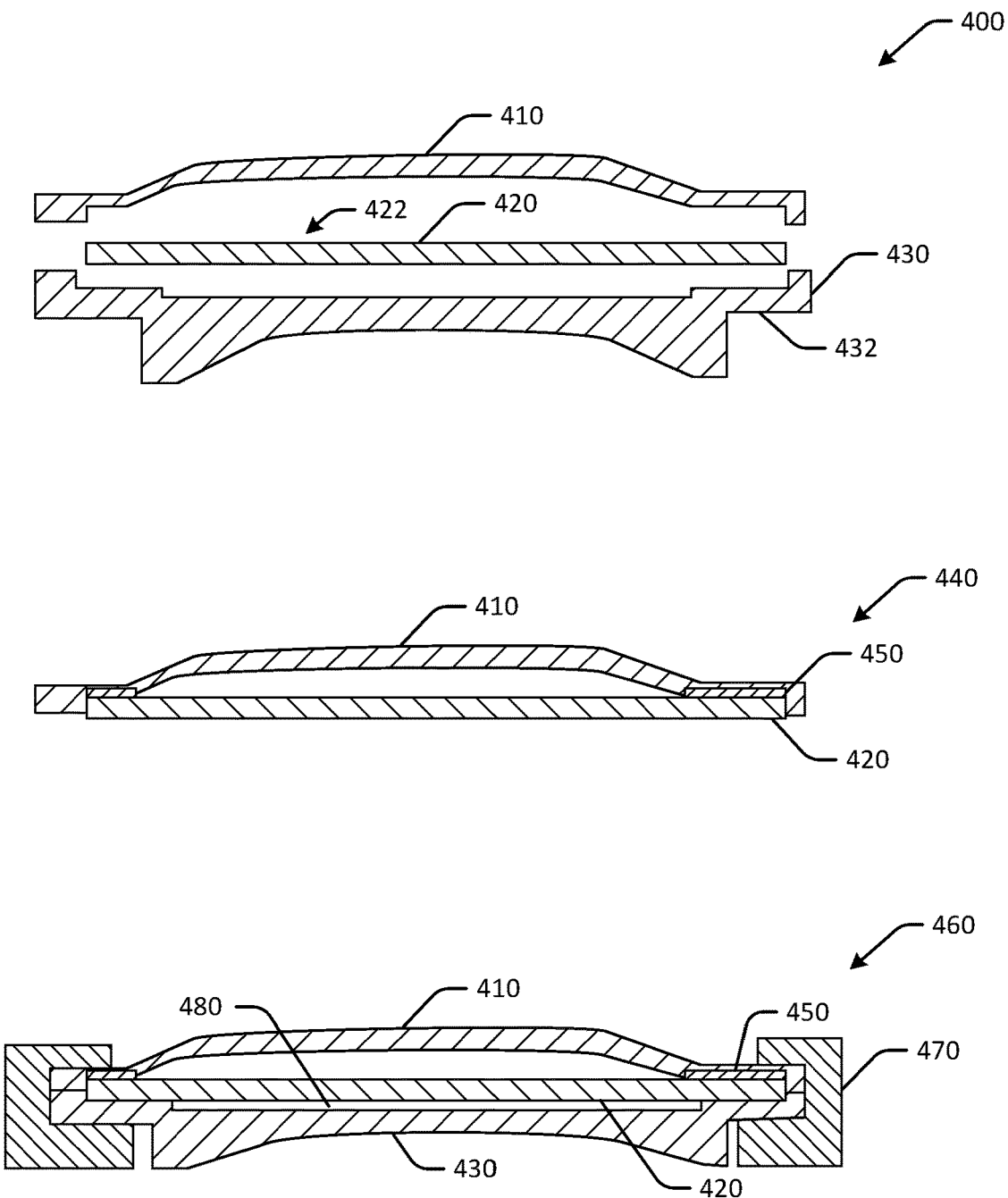
FIG. 4 is a schematic drawing of a cross-sectional view of a lens assembly in different stages of formation in accordance with one or more embodiments of the disclosure.

FIG. 4 is a schematic drawing of a cross-sectional view of a lens assembly in different stages of formation in accordance with one or more embodiments of the disclosure. Other embodiments may include additional or fewer components. The illustrations of FIG. 4 are for illustrative purposes only and are provided only as an example implementation.

In FIG. 4, a lens assembly is depicted in different stages of formation. The lens assembly of FIG. 4, unlike that of FIG. 3, includes a prescription lens that can be removed and replaced. This may allow for a user to retain augmented reality glasses even with a change in eyeglass prescription, or in the event that the prescription lens is damaged. In addition, the embodiment of FIG. 4 may use a physical separation or air gap 480 between the prescription lens and a waveguide instead of a low index of refraction coating. The air gap 480 may allow for similar optical properties as the embodiment of FIG. 3, which may have a reduced amount of internal reflection and/or field of view size. In addition, the embodiment of FIG. 4 may eliminate the assembly step of lamination, and may have a reduced overall weight as a result of direct printing or injection molding the cover lens.

The lens assembly of FIG. 4 may be used with any suitable device, such as an augmented reality device. The augmented reality device may include a wearable frame 470 (a portion of which is illustrated in cross-section view in FIG. 4), and a lens assembly 460 supported by the wearable frame. As depicted in an exploded view 400, the lens assembly 460 may include a cover lens 410, a waveguide 420, and a prescription lens 430 configured to refract light. The prescription lens 430 and/or the cover lens 410 may be formed using 3D printing, injection molding, or another manufacturing process. For example, the cover lens 410 and/or the prescription lens 430 may be 3D printed. The prescription lens 430 may include cutout corners or edges 432 that provide a weight reduction benefit, as well as a thinner and less bulky profile. The cover lens 410 may be a curved cover lens, and may therefore have a non-planar contour. In other embodiments, the cover lens 410 may be flat and may have a planar contour. The cover lens 410 may include an anti-reflective coating on an inner surface and/or an outer surface. The waveguide 420 may be formed of any suitable material, such as plastic or glass. The waveguide 420 may have a thickness of about 0.5 millimeter or less. In some embodiments, the waveguide 420 may include one or more surface features formed on one or more surfaces, such as an outer surface 422. Surface features may include grooves, raised protrusions, bumps, or other surface features, and may improve optics or other light transmission properties of the waveguide 420 (e.g., the surface features discussed with respect to FIG. 3, etc.). The prescription lens 430 may include an anti-reflective coating on an inner surface and/or an outer surface. For example, a first anti-reflective coating may be disposed on the cover lens 410, and a second anti-reflective coating may be disposed on the prescription lens 430. The prescription lens 430 may include a hard coat or anti-scratch coating on the inner surface (e.g., the surface facing the user's eye).

The prescription lens 430 may have a first index of refraction value, such as 1.53. The waveguide 420 may be disposed adjacent to the prescription lens 430, and the waveguide 430 may have a second index of refraction value, such as greater than or equal to 1.7 and/or less than or equal to 2.0. For example, the second index of refraction value may be about 1.75 (e.g., 1.6, 1.7, 1.8, 1.9, etc.). The cover lens 410 may be a curved cover lens that is disposed adjacent to the waveguide 420. In some embodiments, the first index of refraction value is less than the second index of refraction value. For example, the first index of refraction value may be about 1.53, and the second index of refraction value may be about 1.75. In other embodiments, the index of refraction values may be different; however, a difference between the first index of refraction value and the second index of refraction value may be between about 0.45 and about 0.55.

A cover lens subassembly 440 is depicted in FIG. 4. The cover lens subassembly 440 may be formed during a manufacturing process for the lens assembly 460. The cover lens subassembly 440 may be formed by coupling the cover lens 410 and the waveguide 420. For example, adhesive 450 may be used to couple the waveguide 420 to the cover lens 410. Other types of couplers, such as tape, screws, and the like may be used to couple the waveguide 420 to the cover lens 410.

To form the lens assembly 460, the cover lens subassembly 440 may be placed into the frame 470 of the glasses, and the prescription lens 430 may be placed into the frame 470 of the glasses. The prescription lens 430 may be positioned adjacent to the cover lens subassembly 440. The air gap 480 may separate the prescription lens 430 from the waveguide 420. The air gap 480 may have an index of refraction value of 1.0. In some embodiments, as illustrated in FIG. 4, the prescription lens 430 may be separated from the waveguide 420 by a first air gap, and the waveguide 420 may be separated from the cover lens 410 by a second air gap.

The waveguide 420 may therefore be coupled to the cover lens 410, and the waveguide 420 may not be coupled to the prescription lens 430, but for indirect coupling via the frame 470. As a result, the prescription lens 430 may be configured to be removed from the wearable frame 470, without removing the cover lens subassembly 440 as well.

Figure 5:
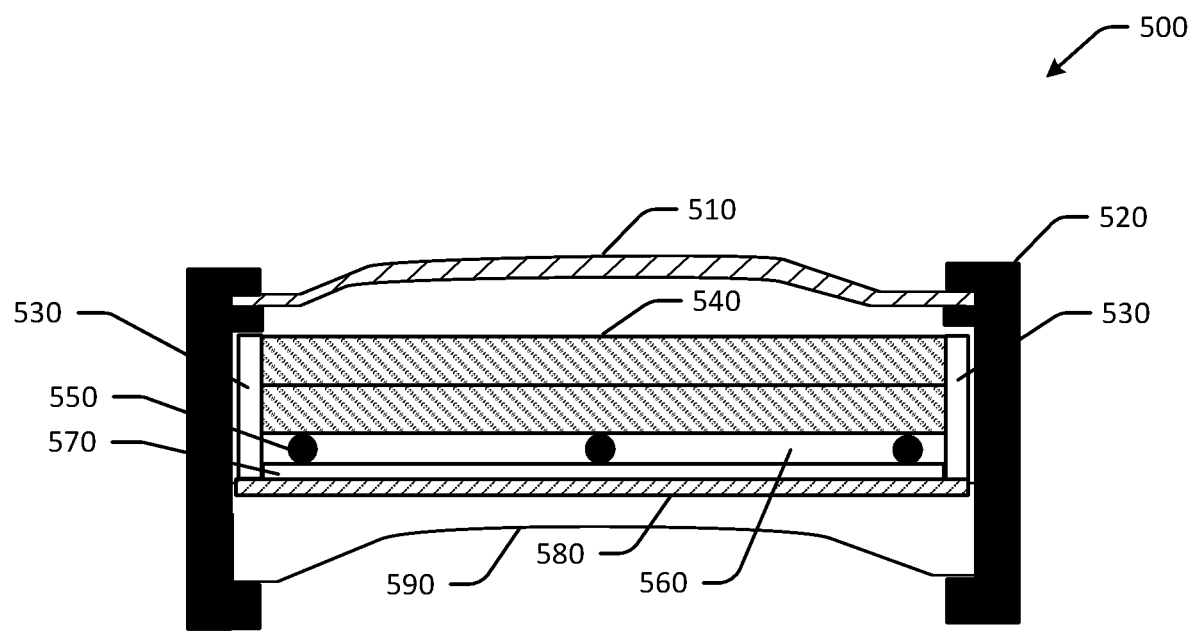
FIG. 5 is a schematic drawing of a cross-sectional view of a lens assembly in accordance with one or more embodiments of the disclosure.

FIG. 5 is a schematic drawing of a cross-sectional view of a lens assembly in accordance with one or more embodiments of the disclosure. Other embodiments may include additional or fewer components. The illustrations of FIG. 5 are for illustrative purposes only and are provided only as an example implementation.

In FIG. 5, a lens assembly is depicted with an air gap 560 instead of a low index of refraction coating, unlike the embodiment of FIG. 3. The air gap 560 may allow for similar optical properties as the embodiment of FIG. 3, which may have a reduced amount of internal reflection and/or field of view size. In addition, the embodiment of FIG. 5 may eliminate the assembly step of lamination, and may have a reduced overall weight as a result of direct printing or injection molding the cover lens.

The lens assembly of FIG. 5 may be used with any suitable device, such as an augmented reality device. The augmented reality device may include a wearable frame 520 (a portion of which is illustrated in cross-section view in FIG. 5), and a lens assembly 500 supported by the wearable frame. The lens assembly 500 may include a cover lens 510, a waveguide 540 (which may be a single layer waveguide or a multi-layer waveguide, etc.), and a prescription lens 590 configured to refract light. The prescription lens 590 and/or the cover lens 510 may be formed using 3D printing, injection molding, or another manufacturing process. For example, the cover lens 510 and/or the prescription lens 590 may be 3D printed. The cover lens 510 may be a curved cover lens, and may therefore have a non-planar contour. In other embodiments, the cover lens 510 may be flat and may have a planar contour. The cover lens 510 may include an anti-reflective coating on an inner surface and/or an outer surface. The waveguide 540 may be formed of any suitable material, such as plastic or glass. The waveguide 540 may have a thickness of about 0.5 millimeter. In some embodiments, the waveguide 540 may include one or more surface features formed on one or more surfaces, such as an outer surface. Surface features may include grooves, raised protrusions, bumps, or other surface features, and may improve optics or other light transmission properties of the waveguide 540 (e.g., the surface features discussed with respect to FIG. 3, etc.). The prescription lens 590 may include an anti-reflective coating on an inner surface and/or an outer surface. For example, a first anti-reflective coating may be disposed on the cover lens 510, and a second anti-reflective coating may be disposed on the prescription lens 590. The prescription lens 590 may include a hard coat or anti-scratch coating on the inner surface (e.g., the surface facing the user's eye). A center thickness of the prescription lens 590 may be thicker than other surfaces of the prescription lens 590, so as to provide a self-supporting or balancing effect. An anti-reflective coating may be applied to the waveguide 540 and/or a cover lens 570. Some or all internal air surfaces may have an anti-reflective coating.

Particles 550 may be disposed on a surface of the waveguide 540 and may function to facilitate formation of the air gap 560 between the waveguide 540 and an adjacent substrate. In some embodiments, the particles 550 may be formed of a hard or hard-to-compress material, such as silicon dioxide, to maintain form under compression or vacuum. The particles 550 may be sprayed onto the waveguide 540. The particles 550 may have a size or diameter of between about 3 microns and about 5 microns, so as to avoid scattering light.

A cover lens 570 may be part of the waveguide assembly and may be formed of plastic or glass. The cover lens 570 may be separated from the waveguide 540 via the particles 550. An edge sealant 530 may be disposed about the cover lens 570 and waveguide 540 stack, so as to maintain the air gap 560. A substrate or coating 580 may be disposed adjacent to the cover lens 570 and may serve as an interface layer for 3D printing or optically clear adhesive components. In some embodiments, the cover lens 570 and/or the substrate 580 may be optional, and may be replaced with a liquid optically clear adhesive layer.

The prescription lens 590 may have a first index of refraction value, such as 1.53. The waveguide 540 may be disposed adjacent to the prescription lens 590, and the waveguide 430 may have a second index of refraction value, such as greater than or equal to 1.7 and/or less than or equal to 1.8. For example, the second index of refraction value may be about 1.75 (e.g., 1.6, 1.7, 1.8, 1.9, etc.). The cover lens 510 may be a curved cover lens (e.g., curved on one side or both inner and outer sides, etc.) that is disposed adjacent to the waveguide 540. In some embodiments, the first index of refraction value is less than the second index of refraction value. For example, the first index of refraction value may be about 1.53, and the second index of refraction value may be about 1.75. In other embodiments, the index of refraction values may be different; however, a difference between the first index of refraction value and the second index of refraction value may be between about 0.45 and about 0.55.

Figure 6:
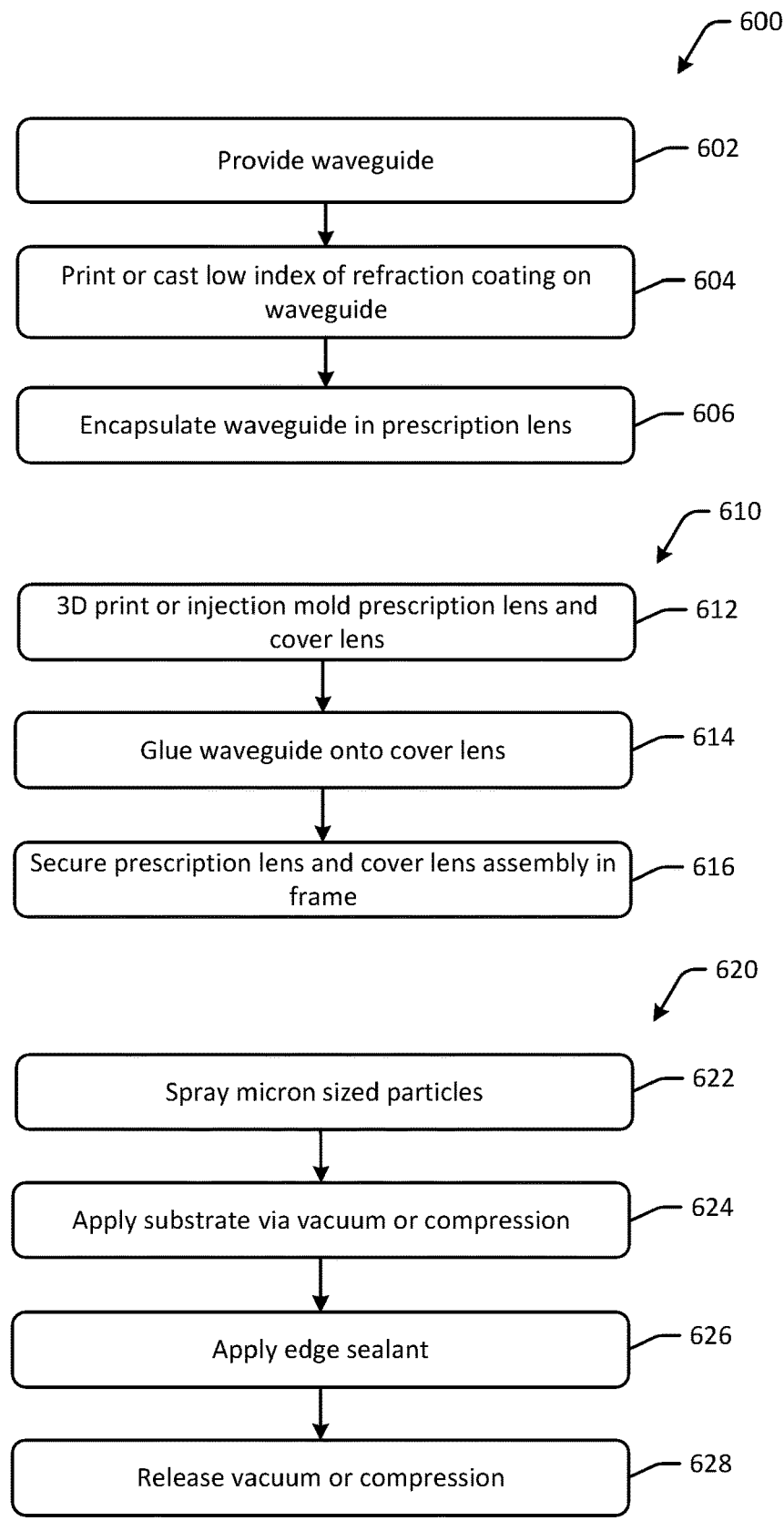
FIG. 6 is a schematic drawing of example methods of manufacture for augmented reality devices with prescription lenses in accordance with one or more embodiments of the disclosure.

FIG. 6 is a schematic drawing of example methods of manufacture for augmented reality devices with prescription lenses in accordance with one or more embodiments of the disclosure. One or more of the operations of FIG. 6 may be performed at least partially concurrently in some embodiments. One or more of the operations of the process flows may be optional and may be performed in any order or at least partially concurrently in some embodiments.

A first process flow 600 may be used to produce lens assemblies with waveguides that are integrated with or embedded in prescription lenses, such as the embodiment illustrated in FIG. 3. The first process flow 600 is provided for illustrative purposes and other processes may be used to manufacture the lens assemblies.

At a first block 602 of the first process flow 600, a waveguide may be provided. For example, a waveguide may be formed or otherwise manufactured and provided for use in the lens assembly. The waveguide may be formed of any suitable material, such as plastic or glass. The waveguide may have a thickness of about 0.5 millimeter. In some embodiments, the waveguide may include one or more surface features formed on one or more surfaces. Surface features may include grooves, raised protrusions, bumps, or other surface features, and may improve optics or other light transmission properties of the waveguide.

At a second block 604 of the first process flow 600, a low index of refraction coating may be printed or casted on the waveguide. For example, a coating of a material having an index of refraction of about 1.25 may be printed, cast, ultraviolet cured, thermal cured, or otherwise deposited onto one or more surfaces of the waveguide. For example, the coating may be disposed on a front side of the waveguide and/or a rear side of the waveguide. The coating may be formed of materials such as plastic materials and other materials. In some embodiments, hollow nanoparticles may be included in the coating material. The coating may be deposited as a layer on one or more sides of the waveguide. For example, the coating layer(s) may be printed onto the waveguide, cast onto the waveguide, or otherwise deposited onto the side(s) of the waveguide.

At a third block 606 of the first process flow 600, the waveguide may be encapsulated or otherwise integrated into a prescription lens. For example, the prescription lens may be formed of a plastic or glass material. The waveguide with the coating layer(s) may be embedded or encapsulated in the prescription lens. For example, the prescription lens may be molded, printed, cast, or otherwise formed around the waveguide. The waveguide may therefore be embedded or encapsulated in the prescription lens. The prescription lens may have a curvature or may otherwise be configured to refract light at a prescription appropriate for a user. The user may therefore wear the prescription lens with a frame and be able to see both content displayed via the waveguide, as well as reality with the appropriate prescription.

A second process flow 610 may be used to produce lens assemblies with waveguides that can be used with removable prescription lenses, such as the embodiment illustrated in FIG. 4. The second process flow 610 is provided for illustrative purposes and other processes may be used to manufacture the lens assemblies.

At a first block 612 of the second process flow 610, a prescription lens and a cover lens may be 3D printed, injection molded, ultraviolet cast, thermocast, or otherwise formed. The prescription lens and the cover lens may be formed separately as discrete components, or may be formed using a single mold. The prescription lens may be configured to refract light in accordance with a user's prescription. The cover lens may be a planar or non-planar contoured cover lens, such as a curved cover lens (e.g., curved as visualized from a cross-sectional perspective, etc.). In some embodiments, the cover lens may serve both a protection function and an aesthetic function. For example, curved cover lens may be a type of style for glasses. The prescription lens may have a thickness of up to about 1.0 millimeter, and the cover lens may have a thickness of up to about 1.0 millimeter, such as about 0.9 millimeter, 1.1 millimeter, and so forth.

At a second block 614 of the second process flow 610, a waveguide may be glued or otherwise coupled to the cover lens. For example, a waveguide may be formed or otherwise manufactured and provided for use in the lens assembly. The waveguide may be formed of any suitable material, such as plastic or glass. The waveguide may have a thickness of about 0.5 millimeter. In some embodiments, the waveguide may include one or more surface features formed on one or more surfaces. Surface features may include grooves, raised protrusions, bumps, or other surface features, and may improve optics or other light transmission properties of the waveguide. The waveguide may be adhered, glued, or otherwise coupled to the cover lens to form a lens subassembly.

At a third block 616 of the second process flow 610, the prescription lens and the cover lens subassembly may be secured in a glasses frame. The glasses frame may be configured to support the prescription lens and the cover lens subassembly, as well as to position the prescription lens and the cover lens subassembly so as to provide alignment. The prescription lens may be physically separated from the waveguide of the cover lens subassembly by an air gap, and a low index of refraction coating may therefore not be needed in this embodiment. Instead, the air gap may provide the index of refraction needed for internal reflection. The prescription lens may be removable from the glasses frame, and can therefore be replaced with a different prescription lens, such as a prescription lens of a different diopter, in the event the user's prescription changes. The prescription lens may be coupled to the cover lens subassembly via the glasses frame (e.g., a mechanical coupling, etc.), but may not be directly coupled or otherwise adhered to the cover lens subassembly in some embodiments. This may allow for replacement of only the prescription lens in the glasses.

A third process flow 620 may be used to produce lens assemblies with waveguides that can be used with prescription lenses, such as the embodiment illustrated in FIG. 5. The third process flow 620 is provided for illustrative purposes and other processes may be used to manufacture the lens assemblies.

At a first block 622 of the third process flow 620, micron sized particles may be sprayed onto a substrate, such as a waveguide. The waveguide may be a single layer waveguide or a multi-layered waveguide. The micron sized particles may be formed of a material that resists compression, such as silicon dioxide, and may have a diameter of between about 3 microns and about 5 microns. The particles may provide spacing so as to create an air gap in the final optics assembly.

At a second block 624, a substrate may be applied via vacuum or compression. For example, a plastic or glass cover lens may be applied or coupled to the waveguide, with the particles disposed between the substrate and the waveguide. A vacuum may be applied, or external compression may be applied. The particles may create physical separation between the substrate and the waveguide.

At a third block 626, edge sealant may be applied. In some instances, the edge sealant may be applied prior to the vacuum or compression, and/or before the micron sized particles. The edge sealant may allow for vacuum pressure to be applied.

At a third block 628, the vacuum or compression may be released, and the optical stack or lens assembly may be formed with an air gap between the substrate and the waveguide. The lens assembly may be completed and can be used with prescription lens components, cover lens components, etc. Any 3D printing or lamination of prescription lens may be completed thereafter.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
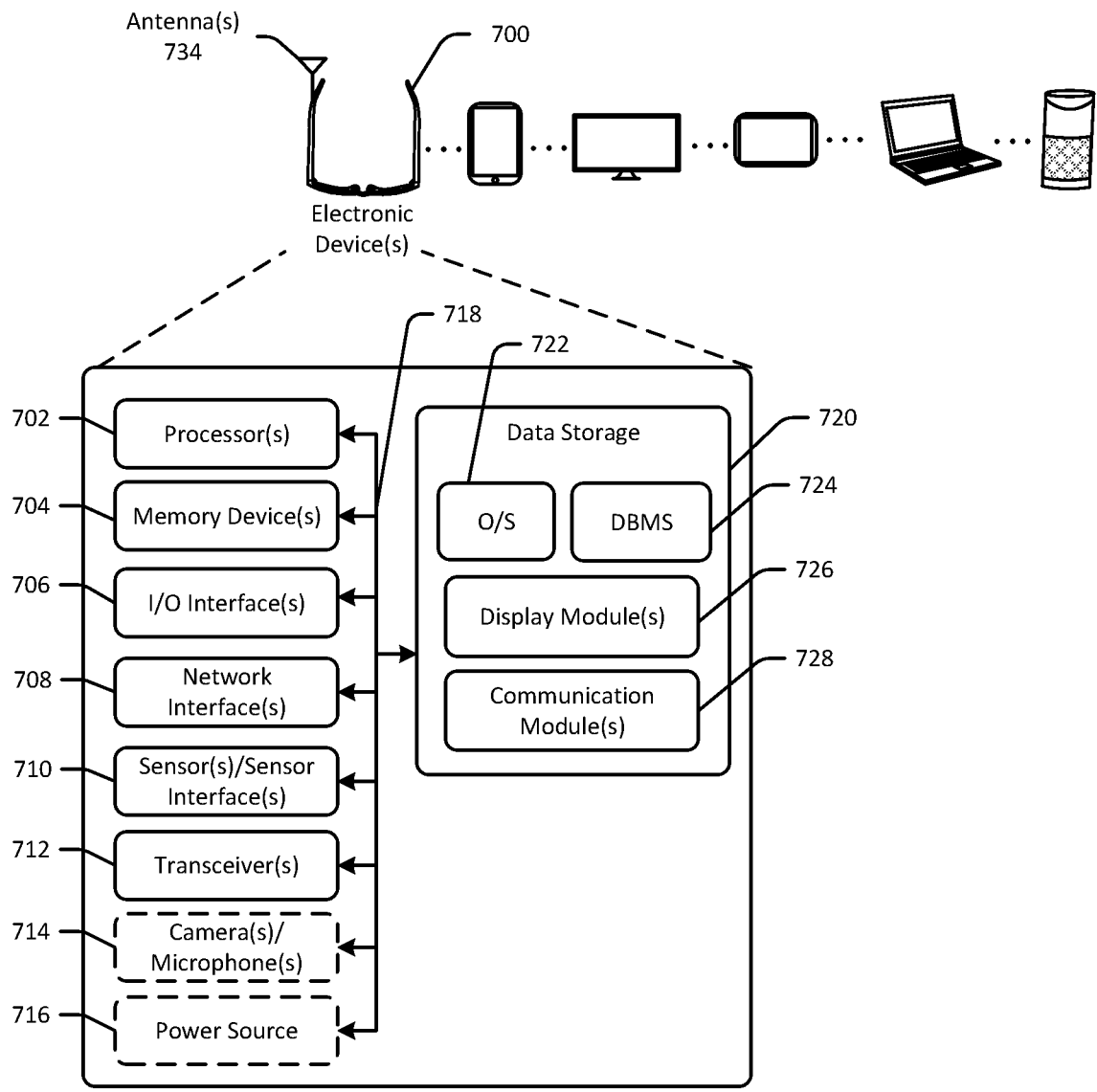
FIG. 7 schematically illustrates example architecture of a device in accordance with one or more embodiments of the disclosure.

FIG. 7 is a schematic block diagram of one or more illustrative electronic device(s) 700 in accordance with one or more example embodiments of the disclosure. The electronic device(s) 700 may include any suitable computing device including, but not limited to, a server system, a mobile device such as a smartphone, a tablet, an e-reader, a wearable device (e.g., augmented reality glasses, virtual reality glasses, etc.), or the like; a desktop computer; a laptop computer; a content streaming device; a set-top box; a scanning device; or the like. The electronic device(s) 700 may correspond to an illustrative device configuration for the device(s) of FIGS. 1-6.

The electronic device(s) 700 may be configured to communicate with one or more servers, user devices, or the like. The electronic device(s) 700 may be any suitable device, such as a mobile device, and may optionally be configured to determine voice commands, determine wakeword utterances, determine and/or control other devices, and other operations. The electronic device(s) 700 may be configured to present content, detect sound, output digital content, and/or other functionality. In some embodiments, a single remote server or a single group of remote servers may be configured to perform more than one type of functionality in conjunction with an electronic device.

The electronic device(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional camera(s) and/or microphone(s) 714, one or more optional power sources 716, and data storage 720. The electronic device(s) 700 may further include one or more bus(es) 718 that functionally couple various components of the electronic device(s) 700. The electronic device(s) 700 may further include one or more antenna(s) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the electronic device(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the electronic device(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more display module(s) 726, one or more communication module(s) 728, and/or other module(s). Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the electronic device(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, an example datastore(s) may include, for example, user preference data and/or other information.

The processor(s) 702 may be configured to access the memory 704 and execute the computer-executable instructions loaded therein. For example, the processor(s) 702 may be configured to execute the computer-executable instructions of the various program module(s), applications, engines, or the like of the electronic device(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the display module(s) 726 may include computer-executable instructions, code, or the like that responsive to execution by one or more of the processor(s) 702 may perform functions including, but not limited to, requesting and/or receiving software updates, generating user interfaces, controller projector operation, causing display of content, generating instructions for individual modules, generating sequences of operations, providing a plug-n-play user interface, and the like.

The communication module(s) 728 may include computer-executable instructions, code, or the like that responsive to execution by one or more of the processor(s) 702 may perform functions including, but not limited to, sending and/or receiving data, including content, sending and/or receiving instructions and commands, and the like.

Referring now to other illustrative components depicted as being stored in the data storage 720, the O/S 722 may be loaded from the data storage 720 into the memory 704 and may provide an interface between other application software executing on the electronic device(s) 700 and the hardware resources of the electronic device(s) 700. More specifically, the O/S 722 may include a set of computer-executable instructions for managing the hardware resources of the electronic device(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 700 is a mobile device, the DBMS 724 may be any suitable lightweight DBMS optimized for performance on a mobile device.

Referring now to other illustrative components of the electronic device(s) 700, the input/output (I/O) interface(s) 706 may facilitate the receipt of input information by the electronic device(s) 700 from one or more I/O devices as well as the output of information from the electronic device(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 700 may further include one or more network interface(s) 708 via which the electronic device(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 734 may include any suitable type of antenna depending, for example, on the communications protocols used to transmit or receive signals via the antenna(s) 734. Non-limiting examples of suitable antennas may include directional antennas, non-directional antennas, dipole antennas, folded dipole antennas, patch antennas, multiple-input multiple-output (MIMO) antennas, or the like. The antenna(s) 734 may be communicatively coupled to one or more transceivers 712 or radio components to which or from which signals may be transmitted or received.

As previously described, the antenna(s) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 734 may be configured to transmit or receive radio frequency signals within any suitable frequency range forming part of the unlicensed portion of the radio spectrum.

The antenna(s) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 734—transmitting or receiving radio frequency (RF) signals in the bandwidth and/or channels corresponding to the communications protocols utilized by the electronic device(s) 700 to communicate with other devices. The transceiver(s) 712 may include hardware, software, and/or firmware for modulating, transmitting, or receiving —potentially in cooperation with any of antenna(s) 734— communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the electronic device(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The camera(s) 714 may be any device configured to capture ambient light or images. The microphone(s) 714 may be any device configured to receive analog sound input or voice data. The power source 716 may be any suitable power sources, such as a power storage device, such as a lithium ion battery and may be in various form factors, a wall outlet, and the like.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the electronic device(s) 700 may include alternate and/or additional hardware, software, or firmware components beyond those described or depicted without departing from the scope of the disclosure. More particularly, it should be appreciated that software, firmware, or hardware components depicted as forming part of the electronic device(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An augmented reality glasses device comprising:
   a wearable frame;
   a wireless radio disposed inside the wearable frame;
   a battery disposed inside the wearable frame;
   a projector disposed inside the wearable frame; and
   a lens coupled to the wearable frame, the lens comprising:
      a prescription lens configured to refract light, the prescription lens having a first index of refraction value of about 1.53;
      a waveguide encapsulated in the prescription lens, the waveguide having a second index of refraction value of about 1.75, wherein the projector is configured to project an image using the waveguide;
      a first layer disposed on a first side of the waveguide, the first layer having a third index of refraction value of about 1.25; and
      a second layer disposed on a second side of the waveguide, the second layer having the third index of refraction value.

2. The augmented reality glasses device of claim 1, wherein the prescription lens has a first side having a planar contour, and a second side having a non-planar contour.

3. The augmented reality glasses device of claim 1, wherein the prescription lens has a non-planar contour, and the waveguide has a planar contour.

4. The augmented reality glasses device of claim 1, wherein the prescription lens is formed of plastic and has an average thickness of at least 1 millimeter, the waveguide is formed of glass and has a thickness of about 0.5 millimeter, and the first layer and the second layer each are formed of a resin material.

5. An augmented reality device comprising:
   a frame;
   a lens coupled to the frame, the lens comprising:
      a first lens configured to refract light, the first lens having a first index of refraction value;
      a waveguide encapsulated in the first lens, the waveguide having a second index of refraction value; and
      a first layer disposed on a first side of the waveguide, the first layer having a third index of refraction value;
      wherein the third index of refraction value is less than the second index of refraction value.

6. The augmented reality device of claim 5, further comprising:
   a set of surface features formed on the first side of the waveguide.

7. The augmented reality device of claim 5, wherein the first lens has a greater average thickness than the waveguide, and the waveguide has a greater average thickness than the first layer.

8. The augmented reality device of claim 5, wherein at least one side of the first lens has a non-planar contour, at least one side of the first lens has a planar contour, and the waveguide has a planar contour.

9. The augmented reality device of claim 5, further comprising:
   a second layer disposed on a second side of the waveguide, the second layer having the third index of refraction value.

10. The augmented reality device of claim 5, wherein a difference between the second index of refraction value and the third index of refraction value is at least 0.50.

11. The augmented reality device of claim 5, wherein the waveguide comprises a first layer and a second layer.

12. The augmented reality device of claim 5, further comprising:
   a projector coupled to the lens and configured to project an image using the waveguide;
   wherein the projector is disposed inside the frame.

13. The augmented reality device of claim 5, further comprising:
   a wireless radio disposed inside the frame; and
   a battery disposed inside the frame.

14. An augmented reality device comprising:
   a frame;
   a lens assembly supported by the frame, the lens assembly comprising:
      a first lens configured to refract light, the first lens having a first index of refraction value;
      a waveguide disposed adjacent to the first lens, the waveguide having a second index of refraction value; and
      a plurality of particles disposed on the waveguide, the plurality of particles configured to provide an air gap between the waveguide and an adjacent component;
      wherein the first index of refraction value is less than the second index of refraction value.

15. The augmented reality device of claim 14, wherein the first lens is separated from the waveguide by a first air gap, and the waveguide is separated from the curved cover lens by a second air gap.

16. The augmented reality device of claim 14, further comprising:
- a cover lens component disposed adjacent to the plurality of particles; and
- a substrate coupled to the cover lens component.

17. The augmented reality device of claim 16, further comprising:
- an edge sealant disposed about the waveguide, the air gap, and the cover lens component.

18. The augmented reality device of claim 14, further comprising:
- a first anti-reflective layer disposed on both sides of the curved cover lens;
- a second anti-reflective layer disposed on both sides of the first lens; and
- a third anti-reflective layer disposed on both sides of the waveguide.

19. The augmented reality device of claim 14, further comprising:
- a curved cover lens disposed adjacent to the waveguide.

20. The augmented reality device of claim 14, wherein the waveguide comprises a first layer and a second layer.

* * * * *